US012123557B2

(12) United States Patent
Joergensen

(10) Patent No.: US 12,123,557 B2
(45) Date of Patent: Oct. 22, 2024

(54) ILLUMINATION DEVICE WITH WHITE AND NON-WHITE SOURCES

(71) Applicant: HARMAN PROFESSIONAL DENMARK APS, Aarhus N (DK)

(72) Inventor: Dennis Thykjaer Joergensen, Roende (DK)

(73) Assignee: Harman Professional Denmark Aps, Aarhus N (DK)

(*) Notice: Subject to any disclaimer, the term of this patent is extended or adjusted under 35 U.S.C. 154(b) by 141 days.

(21) Appl. No.: 17/792,696

(22) PCT Filed: Jan. 15, 2020

(86) PCT No.: PCT/EP2020/050918
§ 371 (c)(1),
(2) Date: Jul. 13, 2022

(87) PCT Pub. No.: WO2021/144018
PCT Pub. Date: Jul. 22, 2021

(65) Prior Publication Data
US 2023/0052955 A1 Feb. 16, 2023

(51) Int. Cl.
*F21S 10/02* (2006.01)
*F21V 5/00* (2018.01)
(Continued)

(52) U.S. Cl.
CPC ............ *F21S 10/023* (2013.01); *F21V 5/007* (2013.01); *F21V 21/15* (2013.01); *F21V 21/30* (2013.01);
(Continued)

(58) Field of Classification Search
CPC ........ F21S 10/023; F21V 5/007; F21V 21/15; F21V 21/30
See application file for complete search history.

(56) References Cited

U.S. PATENT DOCUMENTS

2007/0131954 A1* 6/2007 Murayama ............ H01L 33/507 257/E33.061
2007/0291467 A1* 12/2007 Nagai .................... H05B 45/20 362/231
(Continued)

FOREIGN PATENT DOCUMENTS

EP 2573451 A1 3/2013
WO 2011031635 A1 3/2011

OTHER PUBLICATIONS

International Search Report and Written Opinion, PCT/EP2020/050918, Oct. 2, 2020, 12 pages.

*Primary Examiner* — Bryon T Gyllstrom
(74) *Attorney, Agent, or Firm* — Artegis Law Group, LLP

(57) ABSTRACT

There is presented an illumination device (244) comprising a plurality of light sources (103) emitting light along an optical axis (247); a light collector (241) adapted to collect light from the light sources, wherein the plurality of light sources (103) comprises: A first group (404) of light sources comprising a plurality of light sources, which can be driven to emit white light, a second group (405) of light sources comprising a plurality of light sources which can be driven, such as can only be driven, to emit non-white light (such as green light), wherein the plurality of light sources can be driven so that a total $D_{uv}$ value of light emitted from the illumination device is closer to zero than each of a first $D_{uv}$ value of light emitted from the illumination device originating from the first group (404) of light sources and a second $D_{uv}$ value of light emitted form the illumination device originating from the second group (405) of light sources, and a luminous efficacy of the second group (405) of light sources is higher than a luminous efficacy of the first group (404) of light sources.

20 Claims, 4 Drawing Sheets

(51) Int. Cl.

| | |
|---|---|
| ***F21V 21/15*** | (2006.01) |
| ***F21V 21/30*** | (2006.01) |
| ***F21W 131/406*** | (2006.01) |
| ***F21Y 105/12*** | (2016.01) |
| ***F21Y 113/13*** | (2016.01) |
| ***F21Y 115/10*** | (2016.01) |

(52) U.S. Cl.

CPC .... *F21W 2131/406* (2013.01); *F21Y 2105/12* (2016.08); *F21Y 2113/13* (2016.08); *F21Y 2115/10* (2016.08)

(56) References Cited

U.S. PATENT DOCUMENTS

| | | | | |
|---|---|---|---|---|
| 2009/0002349 | A1 | 1/2009 | Cok et al. | |
| 2012/0147333 | A1* | 6/2012 | Jorgensen | G03B 21/2033 353/31 |
| 2012/0154759 | A1 | 6/2012 | Joergensen | |
| 2014/0133142 | A1* | 5/2014 | Jorgensen | F21V 5/007 362/232 |
| 2015/0380460 | A1* | 12/2015 | Horie | H05B 45/20 257/89 |
| 2016/0227626 | A1* | 8/2016 | Hung | H05B 45/24 |
| 2016/0334278 | A1* | 11/2016 | Rector | G01J 3/465 |
| 2018/0153018 | A1* | 5/2018 | Matsubayashi | F21S 8/04 |
| 2018/0187839 | A1* | 7/2018 | Vampola | H01L 25/0753 |
| 2019/0219249 | A1* | 7/2019 | David | H05B 45/20 |

* cited by examiner

ILLUMINATION DEVICE WITH WHITE AND NON-WHITE SOURCES

CROSS-REFERENCE TO RELATED APPLICATIONS

The present application is a national stage application of the international application titled "ILLUMINATION DEVICE WITH WHITE AND NON-WHITE SOURCES," filed on Jan. 15, 2020, and having application number PCT/EP2020/050918. The subject matter of this related application is hereby incorporated herein by reference.

TECHNICAL FIELD

The present invention relates to an illumination device, such as an illumination device comprising a number of light sources generating light and a number of light collecting means adapted to collect the generated light and to convert the collected light into a number of light beams that propagate along an optical axis, and more particularly to an illumination device for providing white light, and furthermore relates to a corresponding light fixture, method and use.

BACKGROUND

Illumination devices may be utilized, e.g., in light fixtures, such as moving heads, for creating various light effects and/or mood lighting in connection with, e.g., concerts, live shows, TV shows, sport events or as a part in architectural installation light fixtures creating various effects. Typically entertainment light fixtures creates a light beam having a beam width and a divergence and can for instance be wash/flood fixtures creating a relatively wide light beam with a uniform light distribution or it can be profile fixtures adapted to project an image onto a target surface.

It might generally be considered advantageous for illumination devices to be able to emit light at a high luminous efficacy, and particularly advantageous for a white light illumination device to emit white light at a high luminous efficacy, such as even when driven at conditions characterized by high current and/or high (junction) temperature (such as when driving it at typical high luminous flux conditions), which may be above binning conditions. It might generally be considered advantageous for illumination device to have low Correlated Colour Temperature (CCT) variation (both across the beam of the emitted light as well as from fixture to fixture), and particularly advantageous for a white light illumination device to emit white light at a high luminous efficacy, such as even at conditions typical for high luminous flux conditions.

Hence, an improved white light illumination device capable of emitting white light at a high and/or increased luminous efficacy and/or having a low and/or reduced Correlated Colour Temperature (CCT) variation would be desirable.

SUMMARY

It may be seen as an object of the present invention to provide an illumination device, method and/or use for improving at least one or more of luminous efficacy and/or Correlated Colour Temperature (CCT) variation. It is a further object of the present invention to provide an alternative to the prior art.

Thus, the above described object and several other objects are intended to be obtained in a first aspect of the invention by providing an illumination device comprising:

a plurality of light sources emitting light along an optical axis;

a light collector adapted to collect light from the light sources and adapted to project at least a part of said light along said optical axis, wherein the plurality of light sources comprises, such as consists of:

a first group of light sources comprising a plurality of light sources, which can be driven to emit white light, such as the first group of light sources being white light sources, such as the first group of light sources being phosphor-converted white light emitting diodes (LEDs), a second group of light sources comprising a plurality of light sources which can be driven, such as can only be driven, to emit non-white light, such as light having a positive $D_{uv}$ value, such as green light, such as the second group of light sources being green light sources, wherein the plurality of light sources can be driven so that a total $D_{uv}$ value of light emitted from the illumination device is closer to zero, such as at least 0.001 or 0.002 or 0.0003 or 0.005 $D_{uv}$ points closer to zero, than each of a first $D_{uv}$ value of light emitted from the illumination device originating from the first group of light sources and a second $D_{uv}$ value of light emitted form the illumination device originating from the second group of light sources, and a luminous efficacy of the second group of light sources is higher, such as at least 10% higher, such as at least 15% higher, such as at least 20% higher, such as at least 30% higher, such as at least 40% higher, such as at least 50% higher, than a luminous efficacy of the first group of light sources, such as when driven at identical conditions, such as when driven at identical current and (junction) temperature.

In general, $D_{uv}$ is measured as positive or negative values. A negative $D_{uv}$ value means that the color is shifted towards magenta (i.e. below the black bodu line (BBL)). A negative $D_{uv}$ value may arise for some white LEDs when driven at maximum rated current. A positive $D_{uv}$ value means that the color is shifted towards green (i.e. above the black body line).

The invention may be particularly, but not exclusively, advantageous for obtaining an illumination device for emitting white light with a reduced distance/deviation from the black body line (BBL), i.e., having a lower absolute $D_{uv}$ value, compared to light emitted (only) from the first group of (white) light sources, such as even when the first group of (white) light sources is driven at conditions characterized by high current and (junction) temperature (such as when driving it at typical high luminous flux conditions), which may be above binning conditions.

The invention may additionally and/or alternatively be advantageous for obtaining an illumination device for emitting white light wherein the illumination device has a high luminous efficacy. It may be seen as an insight of the present inventor, that white light sources may emit light with non-zero $D_{uv}$ values and that this deviation from the black body line (BBL) can be utilized for increasing the luminous efficacy because it enables combining a first group of (white) light sources with a second group of (non-white) light sources, wherein the latter has higher luminous efficacy than the first (as an example, green LEDs based on ceramic converters may have approximately 30-60% higher luminous efficacy depending on drive conditions compared to white LEDs) so that the total luminous efficiency is increased. In general, ceramic converters are capable of withstanding high operating temperatures as they are not based on phosphor in epoxy or and silicone. Furthermore, the latter is chosen so that a total $D_{uv}$ value of the former and the latter is closer to zero than any one of the former and the latter, i.e., the increase in luminous efficacy of the total emitted white light is surprising achieved via non-white light sources without compromising with the Duv value, and in fact on the contrary improving the $D_{uv}$ value (i.e., reducing the distance to the black body line for the light combined from the first and second group of light sources compared to either of them).

The invention may additionally and/or alternatively be advantageous for reducing a Correlated Colour Temperature (CCT) variation. In a manner similar to the insight presented in the preceding section, it is an insight of the present invention, that the second group of (non-white) light sources may be exploited for reducing a Correlated Colour Temperature (CCT) variation, which effect may be due to a Correlated Colour Temperature (CCT) variation for the second group of light sources being lower than for a Correlated Colour Temperature (CCT) variation for the first group of light sources.

It may be noted that these insights may be particularly relevant in case the first group of light sources comprise, such as consist of, white light LED sources with a converter, such as a phosphor based converter or a ceramic/crystalic converter, for wavelength conversion, driven at high luminous flux conditions (which may be above binning conditions), such as at high current density (e.g. 3 $A/mm^2$) and high junction temperature (e.g., $T_j$=120° C.), where the $D_{uv}$ value may become magenta-shifted (i.e., shifted downwards to lower $D_{uv}$ values) and/or wherein the second group of (non-white) light sources are green light LED sources with a converter, such as a phosphor based converter, for wavelength conversion.

By 'illumination device' is understood as a device for providing light through an optical gate, such as a circular beam of light with certain diameter at the gate and a certain (beam) angle. The optical gate itself may be of different geometries, such as for example circular, elliptical, rectangular, or quadratic. The illumination device may be understood to comprise light sources and optics for providing a beam with required parameters at the gate.

'Light source' is understood as is common in the art, and may generally be an electric light source converting electrical power into luminous flux, such as a Light Emitting Diode (LED), such as a converted LED, such as a phosphor converted LED or a chip on a board (COB).

By 'light collector' may be understood an optical component or system capable of redirecting light, such as receiving (collecting) light with having a direction and reemitting light in another direction, such as comprising one or more (refractive) lenses and/or (reflecting) catoptres. The 'light collector' may in particular be converging, such as capable of receiving light with a certain (wide) angle from the light sources and reemitting a beam with a smaller angle, a collimated beam or even focusing the received light. The light collector may comprise a number of lenslets each collecting light from one of the LEDs and converting the light into a corresponding light beam or the light collector also can be embodied as a single optical lens.

The first group of light sources comprise a plurality, such as at least 10, such as at least 25, such as at least 50, such as at least 75, such as 100 or more light sources.

By 'can be driven to emit white light' may be understood that for some or all conditions, light sources within the first group of light sources must be capable of emitting white light.

'White light' is understood as is common in the art and/or may specifically be understood to be light having a $D_{uv}$ value in the interval [−0.025; +0.025], such as in the interval [−0.020; +0.020], such as in the interval [−0.015; +0.015], such as in the interval [−0.011; +0.011], such as in the interval [−0.011; +0.010], such as in the interval [−0.010; +0.010], such as in the interval [−0.006; +0.006], such as in the interval [−0.003; +0.003], such as in the interval [−0.001; +0.001], and 'white light' may optionally be understood to have a Correlated Colour Temperature (CCT) in the interval [2600 K; 9500 K], such as in the interval [5000 K; 9000 K], such as in the interval [2700 K; 6500 K]. 'White light' may (optionally) additionally or alternatively be understood to have a Colour Rendering Index CIE $R_a$ value of at least 60 and a Correlated Colour Temperature (CCT) in the interval [2600 K; 9500 K].

The '$D_{uv}$' of a color point in a chromaticity coordinate system describes its distance from the black body curve (or black body line (BBL)). The '$D_{uv}$' value may be given as defined by the American National Standards Institute (ANSI), Inc., such as as defined in C78.377, such as in ANSI C78.377-2017 (American National Standard for Electric Lamps—Specifications for the Chromaticity of Solid-State Lighting Products).

Reference to chromaticity and chromaticity (coordinate) system may in general be understood to be a reference to the CIE (Commission internationale de l'éclairage) 1931 color space.

The second group of light sources comprise a plurality, such as at least 2, such as at least 5, such as at least 15, such as at least 10, such as 20 or more light sources.

The total number (sum) of light sources in the first group of light sources and in the second group of light sources may be at least 10, such as at least 20, such as at least 40, such as at least 60, such as at least 80, such as at least 100, such as 120 or more.

'Non-white light' is understood as is common in the art and/or may specifically be understood to be light not qualifying as 'white light'. It may additionally be understood, that non-white light is (human) visible light, such as light at least having a wavelength within the interval [400; 700] nanometers (nm).

By 'a total $D_{uv}$ value of light emitted from the illumination device' may be understood an average $D_{uv}$ value of light exiting the illumination device, such as through an optical gate of the illumination device.

By a '$D_{uv}$ value of light emitted from the illumination device originating from the first group of light sources' may be understood an average $D_{uv}$ value of light emitted from the illumination device, such as through an optical gate of the illumination device, disregarding light originating from the second group of light sources.

By a '$D_{uv}$ value of light emitted from the illumination device originating from the second group of light sources' may be understood an average $D_{uv}$ value of light emitted from the illumination device, such as through an optical gate of the illumination device, disregarding light originating from the first group of light sources.

'Luminous efficacy' is understood as is common in the art and in particular understood the ratio of luminous flux to power consumption. It is to be understood that for the purpose of comparing luminous efficacy of different sources identical conditions are assumed, such a said identical conditions being, e.g., a set of driving current and junction temperature of (1 A; 25° C.) or alternatively a set of driving current and junction temperature (3 A; 120° C.).

According to an embodiment, there is presented an illumination device wherein the first group of light sources comprises a plurality of light sources which can be driven to emit light having a negative $D_{uv}$ value, such as a $D_{uv}$ value of equal to or smaller than −0.006, such as a $D_{uv}$ value of equal to or smaller than −0.015. According to an embodiment, there is presented an illumination device wherein the second group of light sources comprises a plurality of light sources which can be driven to emit light having a positive $D_{uv}$ value, such as a $D_{uv}$ value equal to or larger than 0.006, such as a $D_{uv}$ value equal to or larger than 0.015, such as a $D_{uv}$ value equal to or larger than 0.025.

According to an embodiment, there is presented an illumination device wherein the first group of light sources and the second group of light sources can be driven to have $D_{uv}$ values of opposite sign with respect to each other. An advantage may be that a total $D_{uv}$ value of the total emitted light comprising a contribution from both of the first and second light sources will be closer to zero than any one of the $D_{uv}$ values of the first or the second group of light sources.

According to an embodiment, there is presented an illumination device wherein the second group of light sources comprises a plurality of light sources which can be driven to emit green light, such as the second group of light sources being green light sources, such as the second group of light sources being phosphor-converted green light emitting diodes (LEDs). 'Green light' may be understood as is common in the art, such as light having coordinates in the CIE 1931 color space falling within an area bounded by (a) the black body line, (b) a line between the achromatic point, such as (x; y)=(1/3; 1/3), and a monochromatic point (on the edge of the visible area) with wavelength 490 nm, and (c) a line between the achromatic point, such as (x; y)=(1/3; 1/3), and a monochromatic point (on the edge of the visible area) with wavelength 570 nm and excluding white light, such as excluding light having a positive $D_{uv}$ value of equal to or less than 0.015. According to a more specific definition, 'green light' may be understood as light having coordinates in the CIE 1931 color space falling within an area bounded by (a) the black body line, (b) a line between the achromatic point, such as (x; y)=(1/3; 1/3), and a monochromatic point (on the edge of the visible area) with wavelength 510 nm, and (c) a line between the achromatic point, such as (x; y)=(1/3; 1/3), and a monochromatic point (on the edge of the visible area) with wavelength 570 nm and excluding white light, such as excluding light having a positive $D_{uv}$ value of equal to or less than 0.015. According to a more specific definition, which may be combined with any of the preceding definitions of green light, a chromaticity coordinate (y) is at least 0.45. According to a specific definition, green light may be defined as light with chromaticity coordinates (in the CIE 1931 chromaticity diagram) of x>0.2 and y>0.50, such as x>0.3 and y>0.6, such as defined by a rectangle in the CIE 1931 chromaticity coordinate system with corner coordinates of (x;y)=(0.3093; 0.6398), (x;y)=(0.3160; 0.6498), (x;y)=(0.3260; 0.6431), and (x;y)=(0.3193; 0.6331).

According to an embodiment, there is presented an illumination device wherein a total $D_{uv}$ value of light emitted from the illumination device is closer to zero than each of a first $D_{uv}$ value of light emitted from the illumination device originating from the first group of light sources and a second $D_{uv}$ value of light emitted form the illumination device originating from the second group of light sources, such as wherein a ratio of intensities of light emitted from the first group of light sources and light emitted from the second group of light sources is substantially fixed. Such embodiment may for example be realized by providing appropriate relative intensities of light emitted from the first group of light sources and light emitted from the second group of light sources during manufacture, such as via electronically adjusting a relative power supply, and optionally fixing settings accordingly. Alternatively, such embodiment may be realized by fixing the number of light sources of the first and second groups of light sources for each string.

According to an embodiment, there is presented an illumination device wherein a ratio of intensities of light emitted from the first group of light sources and light emitted from the second group of light sources can be controlled, such as controlled during use. This may be advantageous for allowing a user to change, such as optimize, settings subsequent to manufacture, which may for example be beneficial for achieving a $D_{uv}$ value of zero (even if emission characteristics drift in time), such as for achieving a slight deviation from the black body line (BBL), which might in some instances be preferred. According to an embodiment, there is presented an illumination device wherein an intensity of light emitted from each of the first group of light sources and the second group of light sources can be controlled independently of each other, such as controlled independently of each other during use.

According to an embodiment, there is presented an illumination device wherein one or more light sources within the second group of light sources are placed between light sources within the first group of light sources in a tangential and/or a radial direction with respect to the optical axis, such as wherein an average (such as a geometrical average and/or an intensity weighted average) position of each of the first group of light sources and the second group of light sources is substantially at the optical axis (such as within 3 mm, such as within 2 mm, such as within 1 mm, such as within 0.5 mm, such as within 0.1 mm, from the optical axis), such as at the optical axis, and/or an average distance to the optical axis within 7%, such as within 5%, such as within 2%, such as within 1%, such as within 0.5% relative to outermost radius of the layout of the light sources, and/or one or more light sources within the second group of light sources are placed between light sources within the first group of light sources in accordance with a rotational symmetry, such as a 6 fold symmetry, such as a 4 fold symmetry or such as a 3 fold symmetry, with a 6 fold symmetry for both the first and second groups of light sources being the preferred embodiment. A possible advantage may be that different colors are (evenly) distributed across an area of the light sources, such as an the LED array, to minimize color artefacts.

According to an embodiment, there is presented an illumination device wherein one or more light sources placed most distantly with respect to the optical axis are within the first group of light sources. A possible advantage may be that, e.g., non-white LEDs, such as LEDs with saturated colours, such as green, have a more homogeneous colour distribution than, e.g., white LEDs, and placing them at the edge might go to reduce, minimize or even avoiding color artefacts at beam edge in mid air, such as colored areas at the beam edge.

According to an embodiment, there is presented an illumination device wherein light sources with other spectral characteristics, such as other spectral characteristics than the spectral characteristics of light sources from within the first group or from within the second group, are comprised within the plurality of light sources. A possible advantage is that, e.g., other spectral characteristics (such as other colours) might be beneficial for tuning color point and/or color quality CRI. Light sources with other spectral characteristics may include any one or more of: Red, Converted Red, Amber, converted Amber, Yellow, converted Yellow, Green, Cyan, Converted Lime, Blue, Royal blue, and Converted Magenta (such as a blue die with Red Phosphor leaking a portion of the blue pump).

According to an embodiment, there is presented an illumination device wherein white light is light having a $D_{uv}$ value in the interval [−0.015; +0.015], such as in the interval [−0.011; +0.011], such as in the interval [−0.011; +0.010], such as in the interval [−0.010; +0.010], such as in the interval [−0.006; +0.006], such as in the interval [−0.003; +0.003], such as in the interval [−0.001; +0.001], and a Correlated Colour Temperature (CCT) in the interval [2600 K; 9500 K], such as in the interval [5000 K; 9000 K], such as in the interval [2700 K; 6500 K].

According to an embodiment, there is presented an illumination device wherein the illumination device can be driven to emit a total $D_{uv}$ value of light in the interval [−0.015; +0.075], such as in the interval [−0.015; +0.050], such as in the interval [−0.015; +0.025], such as in the interval [−0.015; +0.015], such as in the interval [−0.011; +0.011], such as in the interval [−0.011; +0.010], such as in the interval [−0.010; +0.010], such as in the interval [−0.006; +0.006], such as in the interval [−0.003; +0.003], such as in the interval [−0.001; +0.001].

According to an embodiment, there is presented an illumination device wherein a number of light sources within the first group of light sources is 2 or more times higher than a number of light sources within the second group of light sources, such as more than twice as high as a number of light sources within the second group of light sources, such as 3 or more times higher, such as 4 or more times higher, such as 5 or more times higher, than a number of light sources within the second group of light sources.

According to an embodiment, there is presented an illumination device wherein the first group of light sources and the second group of light sources are kept in separate strings. 'String' is understood as is common in the art, such as an LED string electrically a plurality of LEDs which can be dimmed together. An advantage of keeping the the first and second group of light sources in different strings may be that their absolute intensitites can be adjusted, such as dimmed, independently of each other.

According to an embodiment, there is presented an illumination device wherein different strings have different ratios of light source from within the first group of light sources and from within the second group of light sources. An advantage of this may be that the relative intensitites of light emitted from the first and second group of light sources can be adjusted.

According to an embodiment, there is presented an illumination device wherein each light source in the second group of light sources comprises a ceramic converter for wavelength conversion. A possible advantage may be that the second group of light sources can reach a higher luminous efficacy with a ceramic converter and optionally furthermore be able to withstand higher current density and/or higher yield higher luminance.

According to an embodiment, there is presented an illumination device wherein each light source in both the first group of light sources and the second group of light sources comprises a ceramic converter for wavelength conversion.

According to an embodiment, there is presented an illumination device wherein an illuminance of the first group of light sources can driven above 350 lm/mm$^2$, such as at above 400 lm/mm$^2$, such as at above 450 lm/mm$^2$, for the effective light emitting surface. According to an embodiment, there is presented an illumination device wherein an illuminance of the second group of light sources can be driven above 250 lm/mm$^2$, such as above 300 lm/mm$^2$, such as above 400 lm/mm$^2$, such as above 500 lm/mm$^2$. For, e.g., profile light or other Etendue limited applications, source illuminance may be important and relevant for how high and output can be reached for a certain size fixture. Illuminance is understood to be for DC operation (not flash) and measured in lumen (lm) per square millimeter (mm$^2$).

According to an embodiment, there is presented an illumination device wherein a luminous efficacy of the second group of light sources is at least 15% higher, such as at least 20% higher, such as at least 25% higher, such as at least 30% higher, such as at least 40% higher, such as at least 50% higher, than a luminous efficacy for the first group of light sources.

According to an embodiment, there is presented an illumination device wherein the light collector comprises a plurality of lenslets adapted to collect light from the light sources and adapted to convert the collected light into a plurality of light beams so that the light beams propagate along said optical axis, where each of said lenslets comprises an entrance surface where said light enters the lenslet and an exit surface where the light exits the lenslet. By 'lenslet' may be understood a lens (of any size, and optionally small) in an array.

According to an embodiment, there is presented an illumination device further comprising one or more color filters, such as color filters for subtractive color mixing, such as dichroic filters or color gels or the like, arranged to be traversed by the optical axis. The colour filters may be graduated and/or be implemented via one or more colour wheels.

According to an embodiment, there is presented an illumination device wherein each lenslet in the plurality of lenslets is a total internal reflection (TIR) lens or wherein the plurality of lenslets comprises two arrays of plano aspherical lenses on top each other, such as wherein said two arrays form a collimating optical system. A possible advantage is improved luminous efficacy of the illumination device, e.g., due to TIR lenses being able to collecting light from high angles of emittance up to ±90°, such as for collimation. As an alternative, each lenslet in the plurality of lenslets is a standard lens element, an aspherical freeform element, a collimating mixer rod, a round or square compound parabolic concentrator (CPC), a Fresnel lens or a combination of the mentioned. As another alternative the array of collimating elements could comprise, such as consist of, combinations of different types of collimating elements placed at different positions in the array.

According to an embodiment, there is presented an illumination device comprises one or more lenses with an anti-reflective (AR) coating. A possible advantage is higher luminous efficacy due to less reflection induced losses.

According to an embodiment, there is presented an illumination device wherein the illumination device is capable of delivering at least 10 klm (i.e., ten thousand lumen or 10 kilolumen), such as at least 20 klm, such as at least 30 klm, such as at least 40 klm.

According to an embodiment, there is presented an illumination device further comprising an optical gate arranged along the optical axis and wherein the light collector is arranged between said plurality of light sources and said optical gate. By 'optical gate' is understood a plane (orthogonal to the optical axis) where optics (e.g., the light collector) of the illumination device is configured to concentrate and/or focus beams of light from the light sources and/or that the optical gate is a physical aperture (i.e., such as the optical gate being a physical aperture placed in or close to a plane wherein beams of the light sources are focused, such as wherein 'close to' implies being placed within a distance from the plane deviating no more than 20% or 15% or 10% or 5% of the distance between the light source and the plane), such as a beam shaping device.

According to a third aspect there is presented a light fixture, such as a moving head comprising an illumination device according to the first aspect. By 'light fixture' is understood an electrical device that contains an (electrical) light source, such as an illumination system with a light source, that provides illumination and wherein the light source and optionally one or more optical components is at least partially enclosed in a housing. The person skilled in (entertainment) light fixtures realizes that a number of light effects can be integrated into the light fixture. According to embodiments, there is presented a light fixture with one or more of a prism for prism effects, an iris for iris effects, framing blades for framing effects, frost filter for frost effects, means for dimming effects, animation wheel for animation effects, one or more gobo wheels. The (entertainment) light fixture can be controlled based on an input signal indicative of light parameters which can be indicative of a target color indicating a decried color of the outgoing light, a number of light effect parameters indicative of a various numbers of light effects. The (entertainment) light fixture may comprise a processor configured to control the different light effects of the light fixture based on the light parameters received by the input signal. For instance the (entertainment) light fixture may comprise the light effects and be controlled based on various parameters as described in WO2010/145658 in particular on page 4 line 11-page 6 line 9.

According to an embodiment, there is presented a light fixture wherein the light fixture is a moving head. A moving head may be understood to be a light fixture with rotating means, such as actuators, for rotating a direction of light emitted from the light fixture around one or two axes being orthogonal to the direction of light emitted from the light fixture. An example of such embodiment may be given by a moving head, such as described in WO2010/145658A1 (see for example figures 1-2 and accompanying description).

According to an embodiment, there is presented a light fixture, such as a moving head, comprising one or more actuators, such as electric motors, such as stepper motors and/or servo motors, for changing a direction of light emitted from the light fixture, such as for rotating a direction of light emitted from the light fixture around one or two axes being orthogonal to the direction of light emitted from the light fixture. A possible advantage is that the direction of light can be changed in an automated manner, which may in particular be relevant for, e.g., theatre lighting, e.g., for stage performances. An example of such embodiment may be given by a moving head, such as described in WO2010/145658A1 (see for example figures 1-2 and accompanying description).

According to an embodiment, there is presented a light fixture further comprising an optical projecting system, such as placed on the opposite side of the optical gate with respect to the plurality of light sources, adapted to collect at least a part of the light emittable from the illumination device and adapted to project at least a part of said light along said optical axis. The optical projection system may for example be configured to project the light passing through an optical gate along a primary optical axis. The optical projecting system may comprise a positive number of optical components and the optical projecting system may be configured to collect light modified by the beam shaping object and project the light collected along the primary optical axis. The projecting system can be configured to adjust the beam width and/or divergence of the light beam exiting the optical projecting system and can be adjusted to image a beam shaping object arranged near an optical gate at a target surface. The optical projecting system can comprise, such as consist of or be used interchangeably with, an optical zoom group and/or an optical focus group, such as wherein the optical zoom group comprises at least one optical component and is configured to adjust the divergence and/or width of the light beam and/or wherein the optical focus group comprises at least one optical component and is configured to focus the image of the beam shaping object at a target surface along the primary optical axis. The optical projecting system can be provided as a fixed group of optical components having a predefined focusing and zoom properties. The at least one optical component of the optical zoom group and/or the optical focus group can be any optical component known in the art of optical such as lenses, prisms, reflectors, etc. It is further noticed the some of the optical components can be movable in relation to the primary optical axis.

According to a third aspect there is presented a method of illuminating with an illumination device according to the first aspect or with a light fixture according to the second aspect, comprising emitting light from the plurality of light sources.

According to an embodiment, there is presented a method further comprising adjusting a ratio of intensity of light emitted from the first group of light sources and from the second group of light sources, such as for adjusting a spectral distribution of light emitted from the illumination device according to the first aspect. A possible advantage is that the method enables, e.g., a user to change, such as optimize, settings, e.g., with a view to achieving a $D_{uv}$ value of zero or for achieving a slight deviation from the black body line (BBL).

According to an embodiment, there is presented a method further comprising driving the first group of light sources so as to emit non-white light. A possible advantage of this may be that when driving the first group of light sources to emit non-white light, they may be able to yield higher luminance.

According to fourth aspect there is presented use of an illumination device according to the first aspect or a light fixture according to the second aspect, for illumination.

BRIEF DESCRIPTION OF THE DRAWINGS

The first, second, third and fourth aspect according to the invention will now be described in more detail with regard to the accompanying figures. The figures show one way of implementing the present invention and is not to be construed as being limiting to other possible embodiments falling within the scope of the attached claim set.

DETAILED DESCRIPTION

Figure 1:
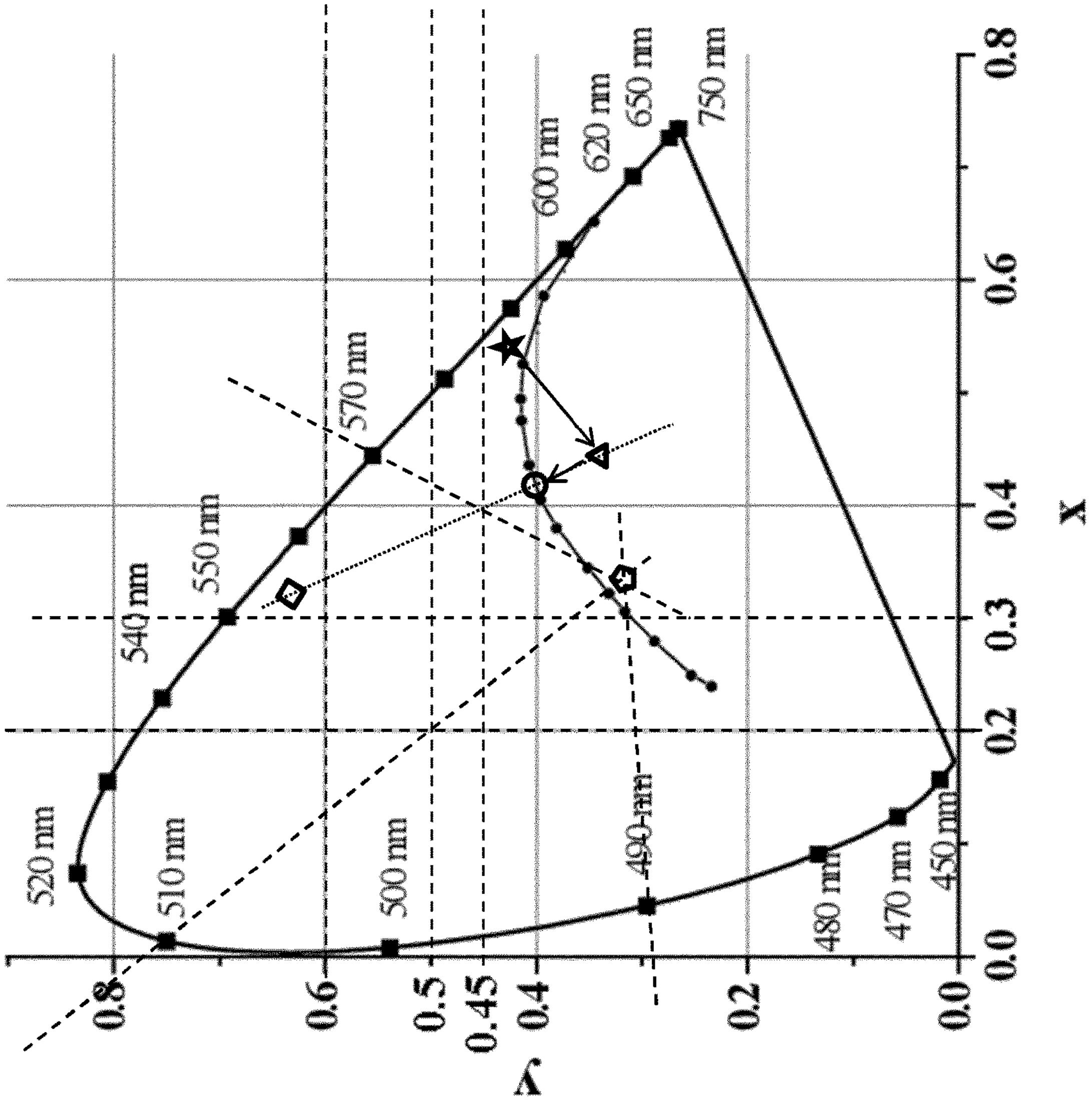
FIG. 1 shows the CIE 1931 color space.

FIG. 1 shows the CIE 1931 color space, wherein the black body line (BBL), also know as the black body curve/locus or the Planckian locus, is shown as the curved line with the full circle markers. Colour coordinates light emitted from the first group of light sources at low intensity may in an exemplary embodiment be given as indicated by the star at approximately (x; y)=(0.525; 0.425) (where the actual distance from the black body line might be exaggerated for clarity). At increasing intensity, the colour coordinate may become magenta shifted as indicated by the downward (and left) pointing arrow between the star and the triangle, and end up at the triangle. By adding light from the second group of light sources, which in itself might have a color coordinate as indicated by the rectangle at around (x; y)=(0.32; 0.64) it might be possible to shift the total color coordinate from the triangle along the dotted line between the triangle and the rectangle in a direction towards the rectangle as indicated by the upward pointing arrow. The figure furthermore shows areas in the color space bounded by dashed lines, which defines green light according to embodiments, such as light having coordinates in the CIE 1931 color space falling within an area bounded by (a) the black body line, (b) a line between the achromatic point (as indicated by the pentagon), such as (x; y)=(1/3; 1/3), and a monochromatic point (on the edge of the visible area) with wavelength 490 nm, and (c) a line between the achromatic point and a monochromatic point with wavelength 570 nm and excluding white light, such as excluding light having a positive $D_{uv}$ value of equal to or less than 0.015.

Figure 2:
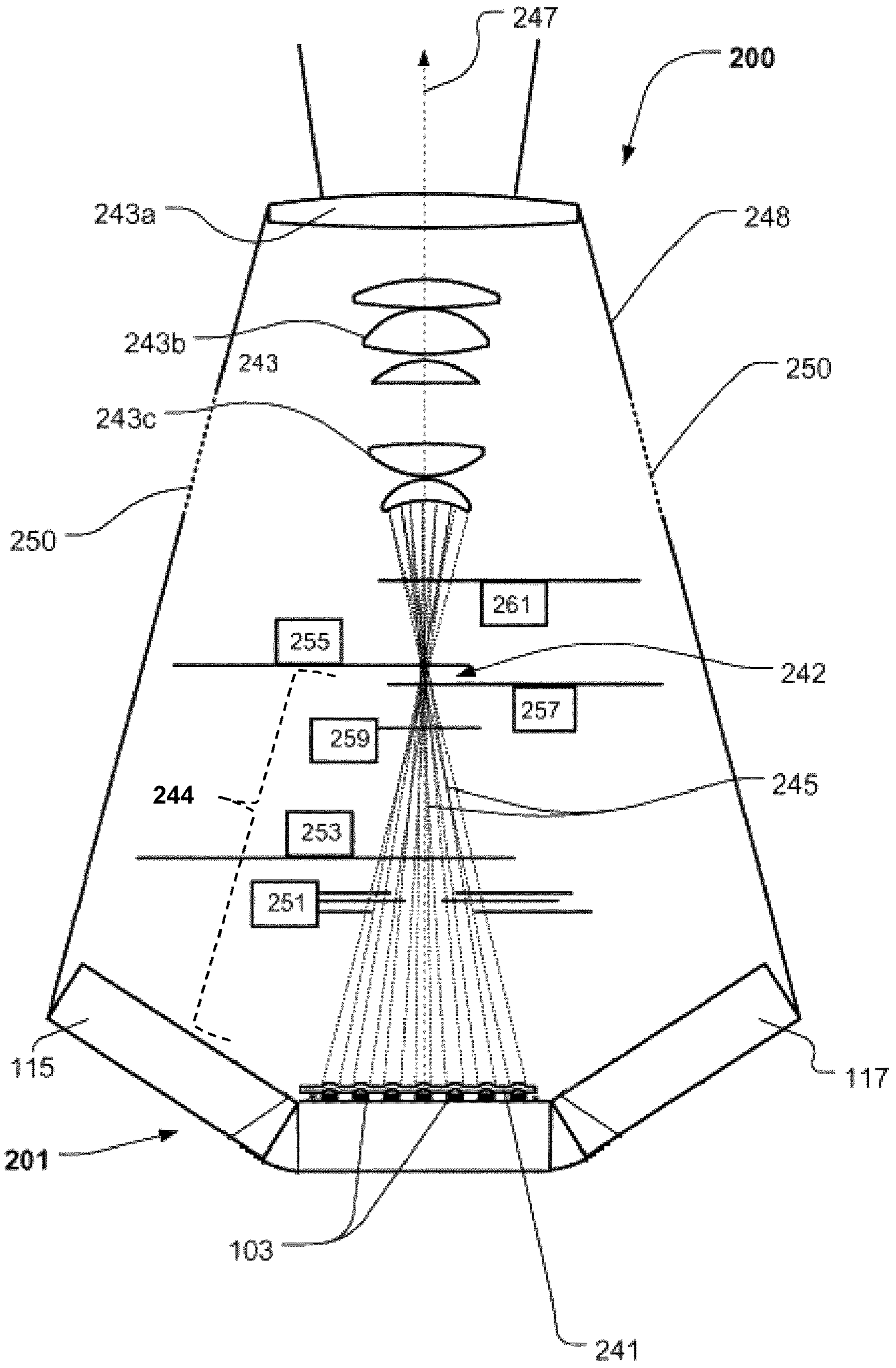
FIG. 2 shows a light fixture 200 comprising an illumination device 244.

FIG. 2 shows a light fixture 200 comprising an illumination device 244, wherein the illumination device comprises a plurality of LEDs 103, a light collector 241, an optical gate 242 and an optical projecting and zoom system 243. The light collector 241 is adapted to collect light from the LEDs 103 and to convert the collected light into a plurality of light beams 245 (dotted lines) propagating along an optical axis 247 (dash-dotted line). The light collector can be embodied as any optical means capable of collecting at least a part of the light emitted by the LEDs and convert the collected light to light beams. In the illustrated embodiment the light collector comprises a number of lenslets each collecting light from one of the LEDs and converting the light into a corresponding light beam. However it is noticed that the light collector also can be embodied as a single optical lens, a Fresnel lens, a number of TIR lenses (total reflection lenses), a number of light rods or combinations thereof. It is understood that light beams propagating along the optical axis contain rays of light propagating at an angle, e.g. an angle less that 45 degrees to the optical axis. The light collector may be configured to fill the optical the gate 242 with light from the light sources 103 so that the area, i.e. the aperture, of the gate 242 is illuminated with a uniform intensity or optimized for max output. The gate 242 is arranged along the optical axis 247. The optical projecting system 243 may be configured to collect at least a part of the light beams transmitted through the gate 242 and to image the optical gate at a distance along the optical axis. For example, the optical projecting system 243 may be configured to image the gate 242 onto some object such as a screen, e.g. a screen on a concert stage. A certain image, e.g. some opaque pattern provided on a transparent window, an open pattern in a non-transparent material, or imaging object such as GOBOs known in the field of entertainment lighting, may be contained within the gate 242 so that that the illuminated image can be imaged by the optical projecting system. Accordingly, the illumination device 200 may be used for entertainment lighting. In the illustrated embodiment the light is directed along the optical axis 247 by the light collector 241 and passes through a number of light effects before exiting the illumination device through a front lens 243*a*. The light effects can for instance be any light effects known in the art of intelligent/entertainments lighting for instance, a CMY color mixing system 251, color filters 253, gobos 255, animation effects 257, iris effects 259, a focus lens group 243*c*, zoom lens group 243*b*, prism effect 261, framing effects (not shown), or any other light effects known in the art. The mentioned light effects only serves to illustrate the principles of an illuminating device for entertainment lighting and the person skilled in the art of entertainment lighting will be able to construct other variations with additional are less light effects. Further it is noticed that the order and positions of the light effects can be changed. The illumination device comprises a cooling module 201 with first 115 and second 117 blowers. The light fixture comprises a lamp housing 248 provided with a number of openings 250.

Figure 3:
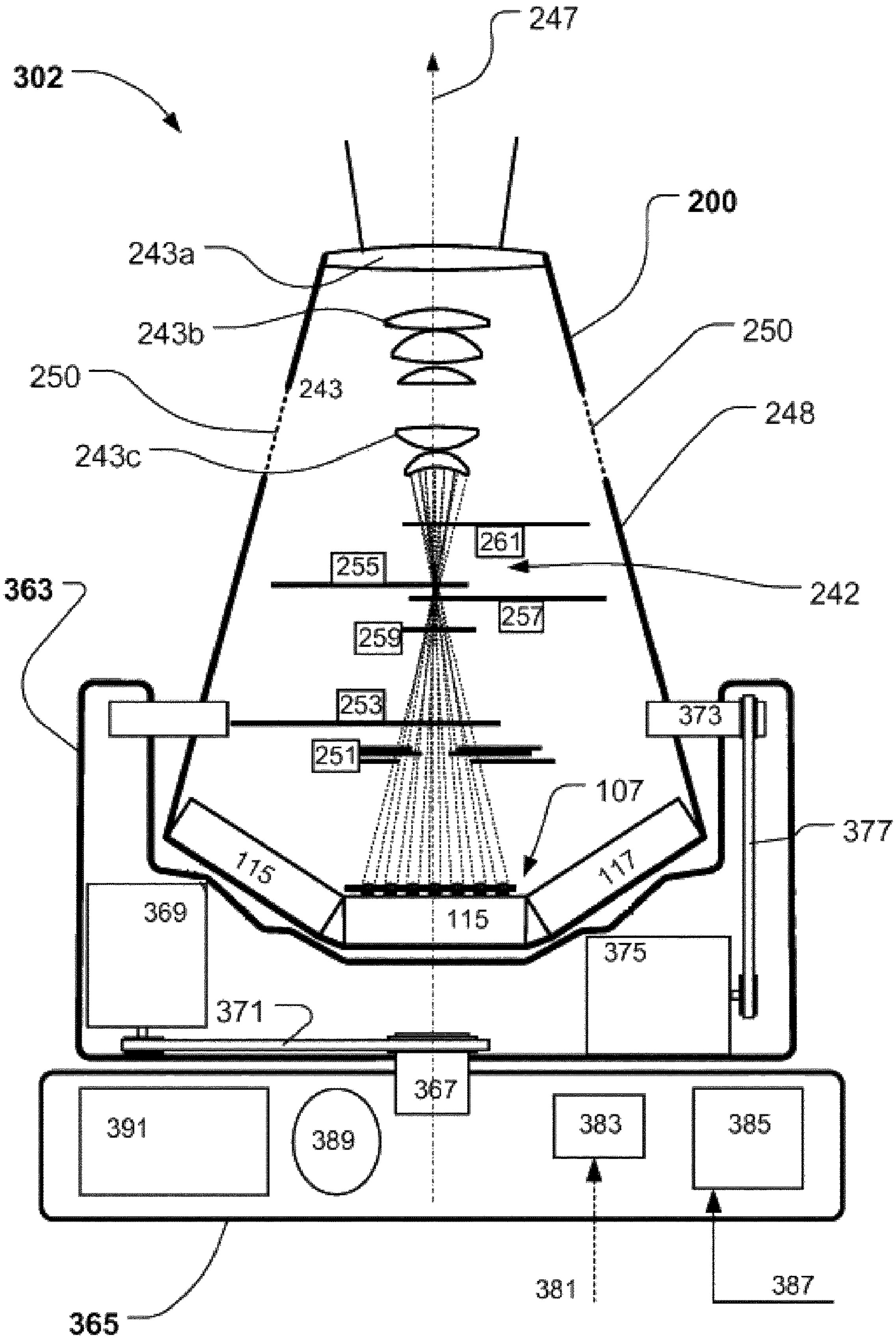
FIG. 3 illustrates a structural diagram of a moving head light fixture 302.

FIG. 3 illustrates a structural diagram of a moving head light fixture 302 comprising a head 200 rotatably connected to a yoke 363 where the yoke is rotatably connected to a base 365. The head is substantially identical to the light fixture shown in FIG. 2 and substantial identical features are labeled with the same reference numbers as in FIG. 2 will not be described further. The moving head light fixture comprises pan rotating means for rotating the yoke in relation to the base, for instance by rotating a pan shaft 367 connected to the yoke and arranged in a bearing (not shown) in the base). A pan motor 369 is connected to the shaft 367 through a pan belt 371 and is configured to rotate the shaft and yoke in relation to the base through the pan belt. The moving head light fixture comprises tilt rotating means for rotating the head in relation to the yoke, for instance by rotating a tilt shaft 373 connected to the head and arranged in a bearing (not shown) in the yoke). A tilt motor 375 is connected to the tilt shaft 373 through a tilt belt 377 and is configured to rotate the shaft and head in relation to the yoke through the tilt belt. The skilled person will realize that the pan and tilt rotation means can be constructed in many different ways using mechanical components such as motors, shafts, gears, cables, chains, transmission systems, bearings etc. Alternatively it is noticed that it also is possible to arrange the pan motor in the base and/or arrange the tilt motor in the head. The space between the yoke 363 and the bottom part of the head is limited as the moving head light fixture is designed to be as small as possible. As known in the prior art the moving head light fixture receives electrical power 381 from an external power supply (not shown). The electrical power is received by an internal power supply 383 which adapts and distributes electrical power through internal power lines (not shown) to the subsystems of the moving head. The internal power system can be constructed in many different ways for instance by connecting all subsystems to the same power line. The skilled person will however realize that some of the subsystems in the moving head need different kind of power and that a ground line also can be used. The light source will for instance in most applications need a different kind of power than step motors and driver circuits. The light fixture comprises also a controller 385 which controls the components (other subsystems) in the light fixture based on an input signal 387 indicative light effect parameters, position parameters and other parameters related to the moving head lighting fixture. The controller receives the input signal from a light controller (not shown) as known in the art of intelligent and entertainment lighting for instance by using a standard protocol like DMX, ArtNET, RDM etc. Typically the light effect parameter is indicative of at least one light effect parameter related to the different light effects in the light system. The controller 385 is adapted to send commands and instructions to the different subsystems of the moving head through internal communication lines (not shown). The internal communication system can be based on a various type of communications networks/systems. The moving head can also comprise user input means enabling a user to interact directly with the moving head instead of using a light controller to communicate with the moving head. The user input means 389 can for instance be bottoms, joysticks, touch pads, keyboard, mouse etc. The user input means can also be supported by a display 391 enabling the user to interact with the moving head through a menu system shown on the display using the user input means. The display device and user input means can in one embodiment also be integrated as a touch screen.

Figure 4:
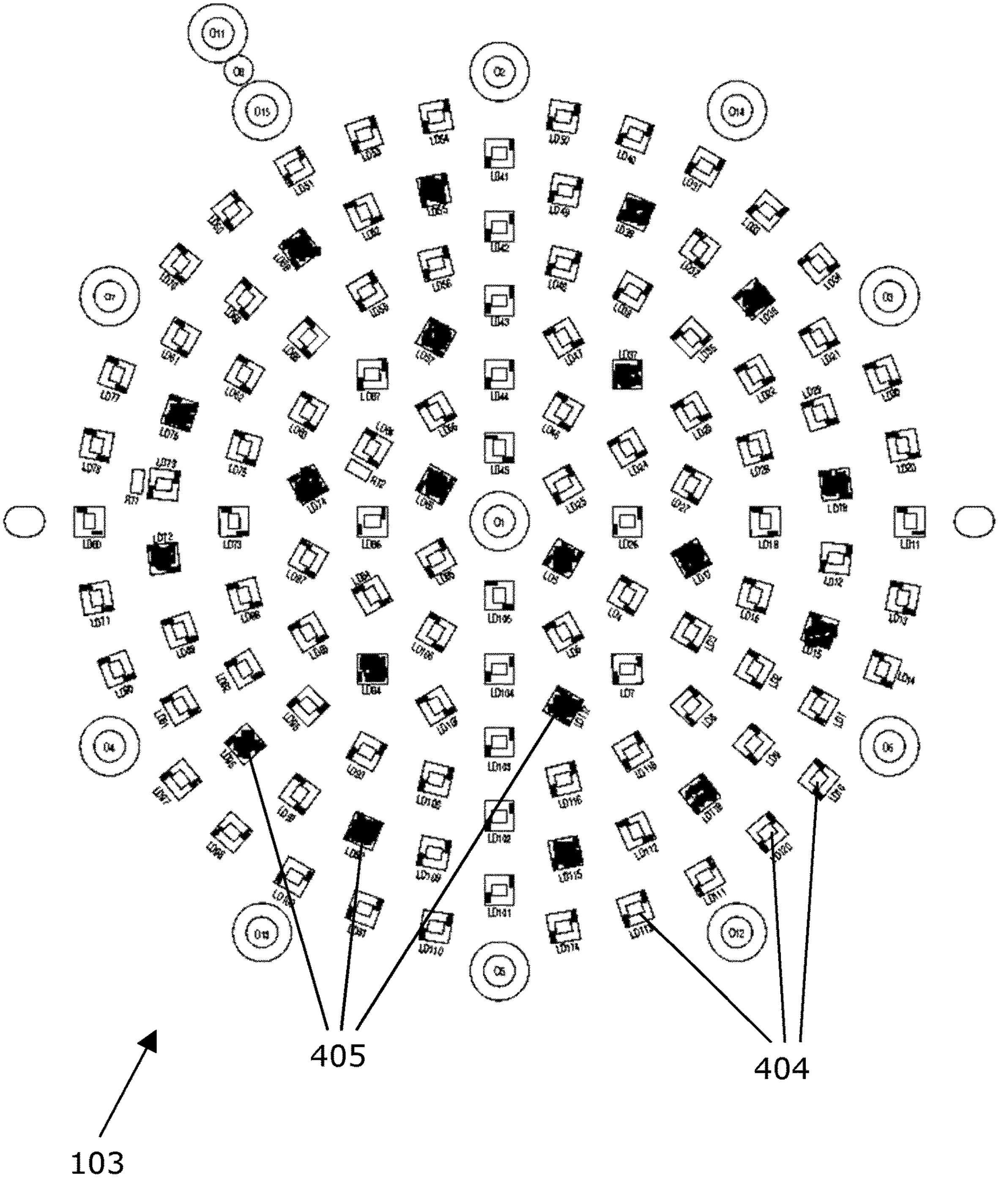
FIG. 4 shows a layout of LEDs 103 as viewed in a direction along the optical axis 247.

FIG. 4 shows a layout of LEDs 103 as viewed in a direction along the optical axis 247, e.g., in a direction from the gate 242 towards the LEDs 103. The first group 404 of LEDs are shown with open structure and the second group 405 of LEDs are shown with closed (black) structure). Light sources within the second group of light sources are placed between light sources within the first group of light sources in a tangential and a radial direction with respect to the optical axis (which is in the center of the circular pattern and oriented orthogonal to the plane of the paper). An average (such as a geometrical average and an intensity weighted average) position of each of the first group of light sources and the second group of light sources is at the optical axis. The light sources placed most distantly with respect to the optical axis are within the first group of light sources.

The first group of light sources may for example comprise, such as consist of LEDs from OSRAM Opto Semiconductors GmbH (Regensburg, Germany) of type KW CSLNM1.TG and/or LEDs with characteristics as described in the corresponding product sheet (retrieveable, e.g., at https://www.osram-os.com/) denoted "Version 1.2" and dated 2018 May 7.

The second group of light sources may for example comprise, such as consist of LEDs from OSRAM Opto Semiconductors GmbH (Regensburg, Germany) of type KP CSLNM1.F1 and/or LEDs with characteristics as described in the corresponding product sheet (retrieveable, e.g., at https://www.osram-os.com/) denoted "Version 1.6" and dated 2018 Apr. 25.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An illumination device comprising:

a plurality of light sources emitting light along an optical axis; and a light collector adapted to collect light from the plurality of light sources and adapted to project at least a part of said light along said optical axis, wherein the plurality of light sources comprises:

a first group of light sources comprising a plurality of light sources, which can be driven to emit white light, and a second group of light sources comprising a plurality of light sources which can be driven to emit non-white light, wherein the plurality of light sources can be driven so that:

a total $D_{uv}$ value of light emitted from the illumination device is closer to zero than each of a first $D_{uv}$ value of light emitted from the illumination device originating from the first group of light sources and a second $D_{uv}$ value of light emitted from the illumination device originating from the second group of light sources, and a luminous efficacy of the second group of light sources is higher than a luminous efficacy of the first group of light sources.

2. The illumination device according to claim 1, wherein each of the plurality of light sources in the first group of light sources can be driven to emit light having a negative $D_{uv}$ value.

3. The illumination device according to claim 1, wherein each of the plurality of light sources in the second group of light sources can be driven to emit light having a positive $D_{uv}$ value.

4. The illumination device according to claim 1, wherein the first group of light sources and the second group of light sources can be driven to have $D_{uv}$ values of opposite sign with respect to each other.

5. The illumination device according to claim 1, wherein each of the plurality of light sources in the second group of light sources can be driven to emit green light.

6. The illumination device according to claim 1, wherein a ratio of intensities of light emitted from the first group of light sources and light emitted from the second group of light sources is substantially fixed.

7. The illumination device according to claim 1, wherein a ratio of intensities of light emitted from the first group of light sources and light emitted from the second group of light sources can be controlled.

8. The illumination device according to claim 1, wherein one or more light sources within the second group of light sources are placed between light sources within the first group of light sources in a tangential and/or a radial direction with respect to the optical axis.

9. The illumination device according to claim 1, wherein one or more light sources placed most distantly with respect to the optical axis are within the first group of light sources.

10. The illumination device according to claim 1, wherein white light emitted from the illumination device is light having a $D_{uv}$ value in an interval [−0.015; +0.015] and a Correlated Colour Temperature (CCT) in an interval [2600 K; 9500 K].

11. The illumination device according to claim 1, wherein the illumination device can be driven to emit a total $D_{uv}$ value of light in an interval [−0.015; +0.015].

12. The illumination device according to claim 1, wherein a number of light sources within the first group of light sources is 2 or more times higher than a number of light sources within the second group of light sources.

13. The illumination device according to claim 1, wherein the first group of light sources and the second group of light sources are kept in separate strings.

14. The illumination device according to claim 1, wherein each light source in the second group of light sources comprises a ceramic converter for wavelength conversion.

15. The illumination device according to claim 1, wherein:

an illuminance of the first group of light sources can be driven above 350 lm/mm for an effective light emitting surface; or an illuminance of the second group of light sources can be driven above 250 $lm/mm^2$.

16. The illumination device according to claim 1, wherein a luminous efficacy of the second group of light sources is at least 15% higher than a luminous efficacy for the first group of light sources.

17. The illumination device according to claim 1, wherein the light collector comprises a plurality of lenslets adapted to collect light from the plurality of light sources and adapted to convert the collected light into a plurality of light beams so that the light beams propagate along said optical axis, where each of said lenslets comprises an entrance surface where the light enters the lenslet and an exit surface where the light exits the lenslet.

18. The illumination device according to claim 1, further comprising one or more color filters.

19. The illumination device according to claim 1, wherein the illumination device is capable of delivering at least 10 klm.

20. The illumination device according to claim 1, further comprising an optical gate arranged along the optical axis and wherein the light collector is arranged between said plurality of light sources and said optical gate.

* * * * *